Oct. 31, 1939.   G. H. FRITZINGER   2,178,072
BAND DISCRIMINATING MEANS AND METHOD
Filed March 26, 1937   9 Sheets-Sheet 1
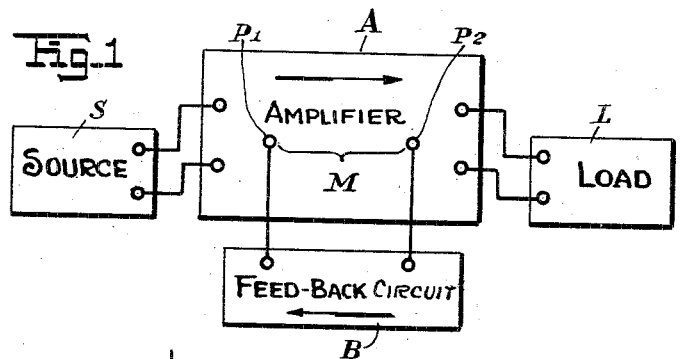
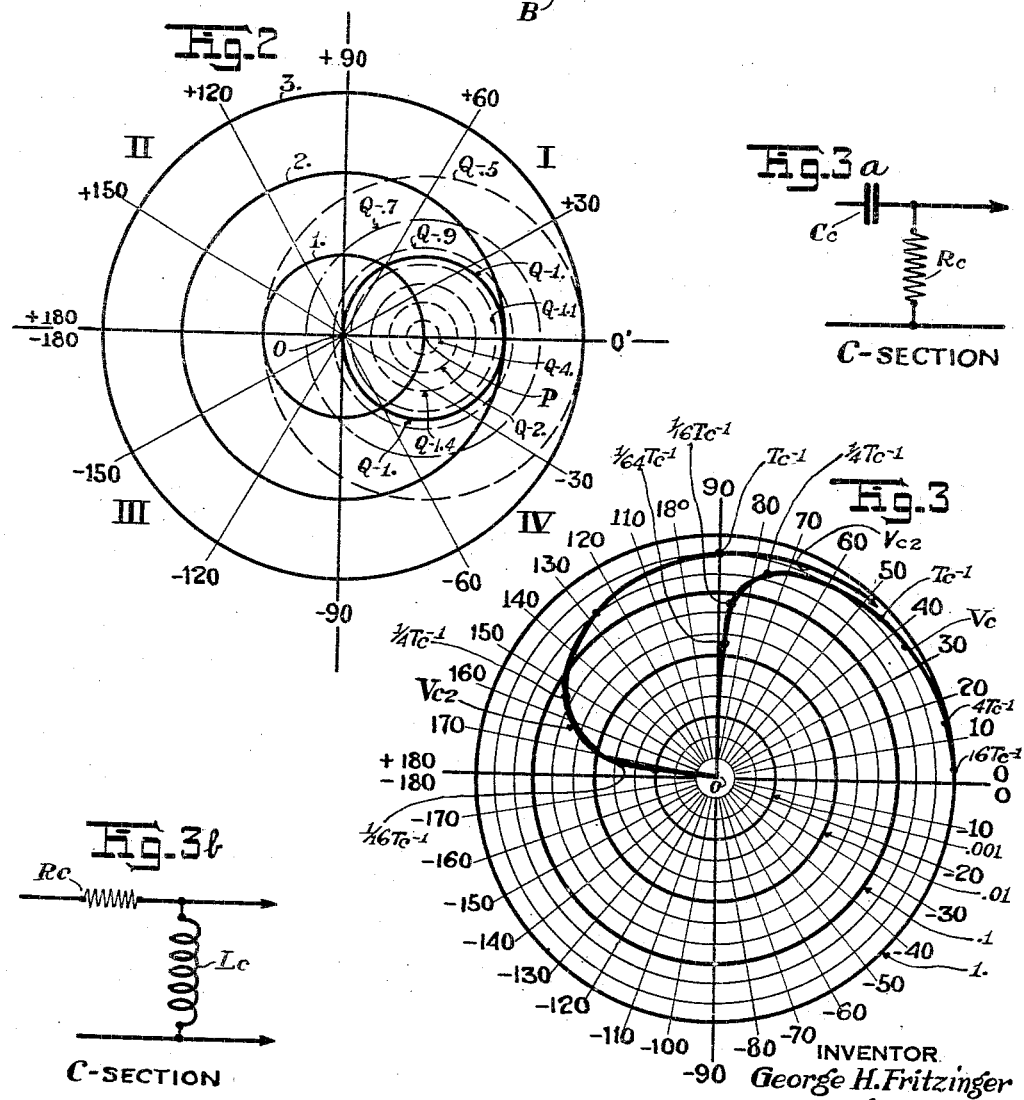

Oct. 31, 1939.   G. H. FRITZINGER   2,178,072
BAND DISCRIMINATING MEANS AND METHOD
Filed March 26, 1937

$h$-SECTION $h$-SECTION

INVENTOR
*George H. Fritzinger*
BY
*Henry Lanahan*
ATTORNEY

Oct. 31, 1939.    G. H. FRITZINGER    2,178,072
BAND DISCRIMINATING MEANS AND METHOD
Filed March 26, 1937    9 Sheets-Sheet 3

INVENTOR
George H. Fritzinger
BY
ATTORNEY

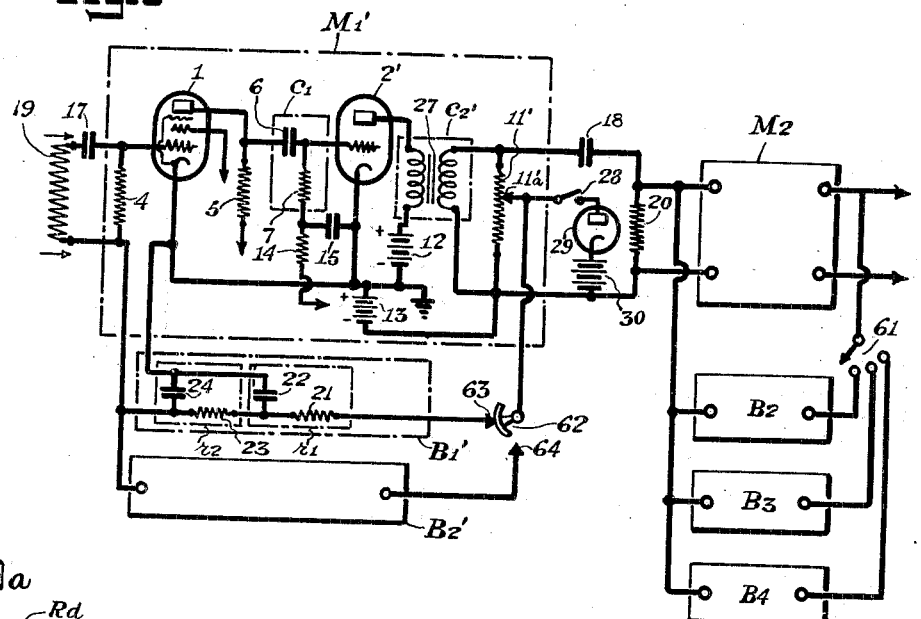
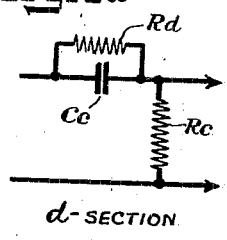
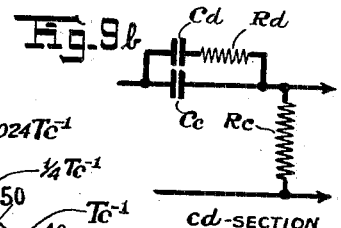
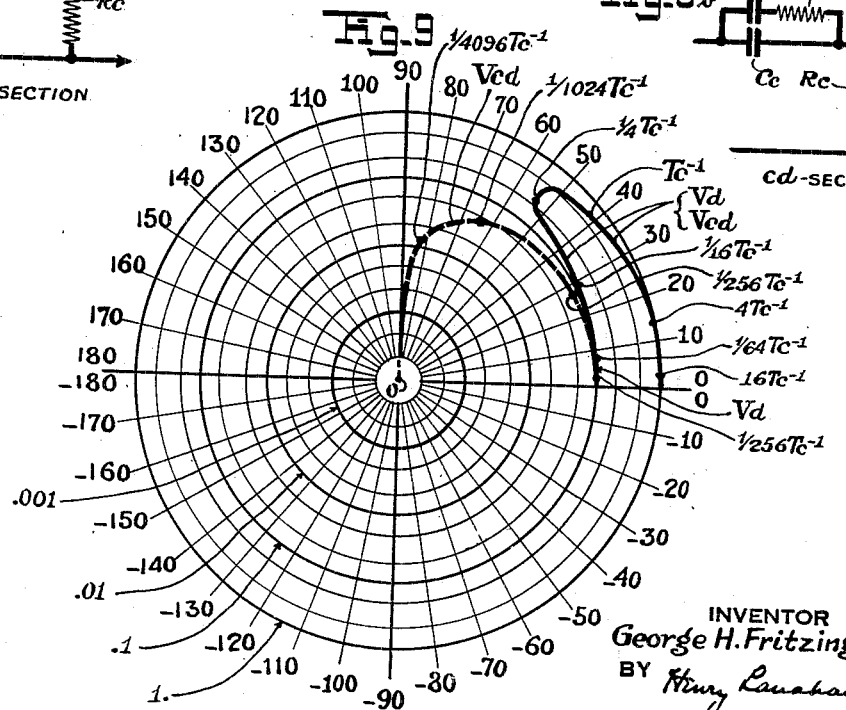

INVENTOR
George H. Fritzinger
BY Henry Lanahan
ATTORNEY

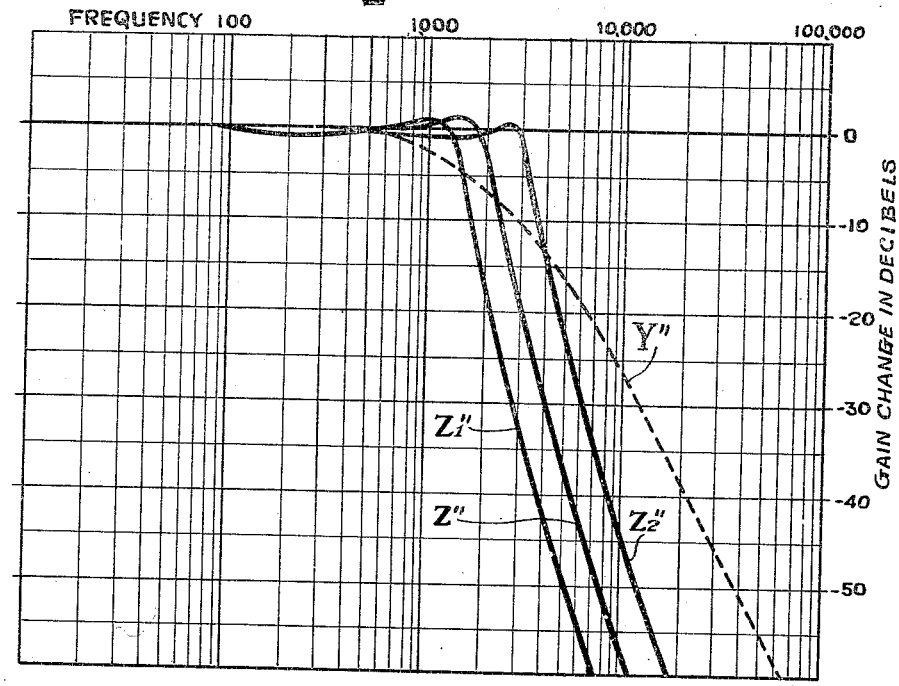
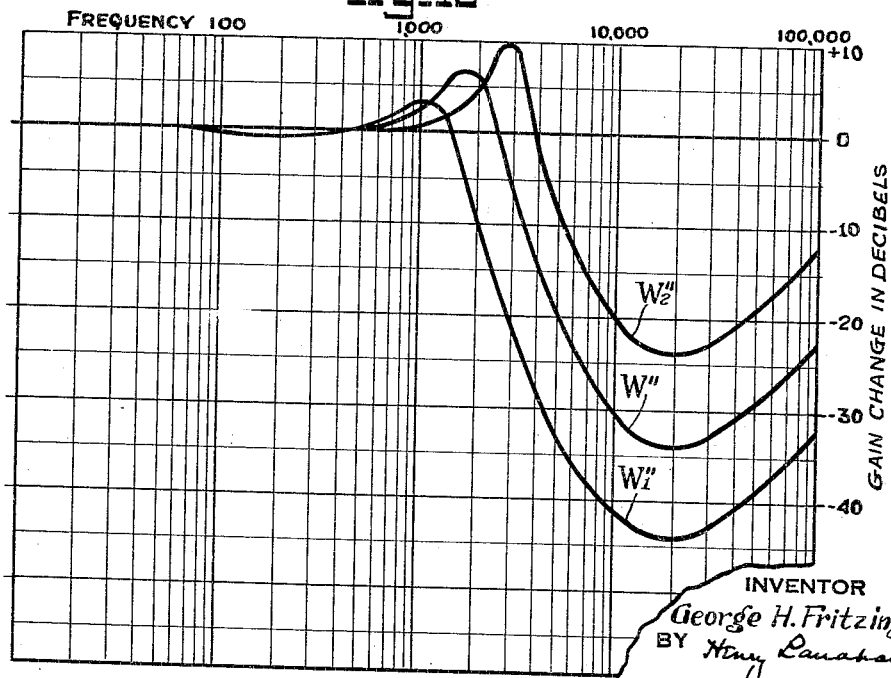

Oct. 31, 1939.    G. H. FRITZINGER    2,178,072
BAND DISCRIMINATING MEANS AND METHOD
Filed March 26, 1937    9 Sheets-Sheet 7
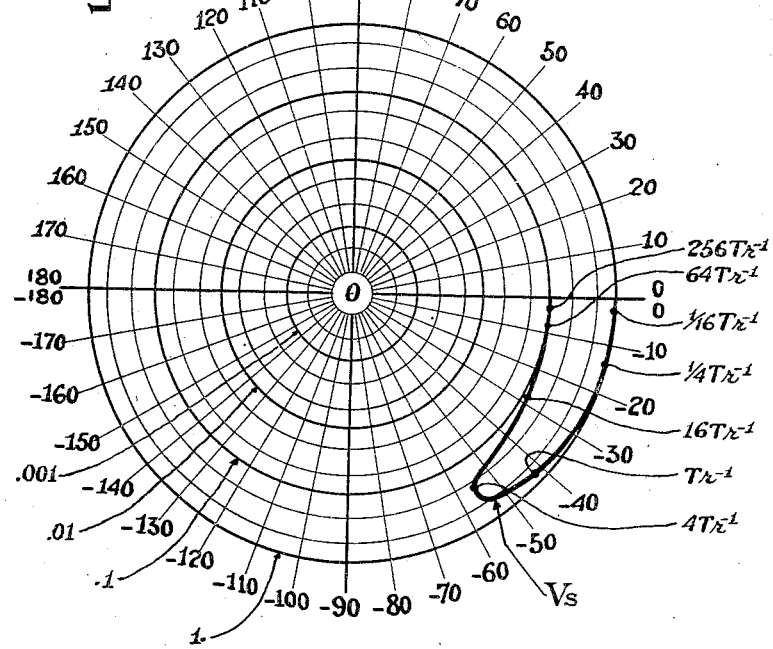
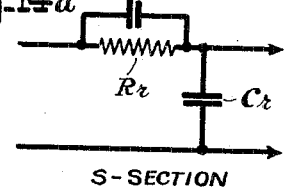
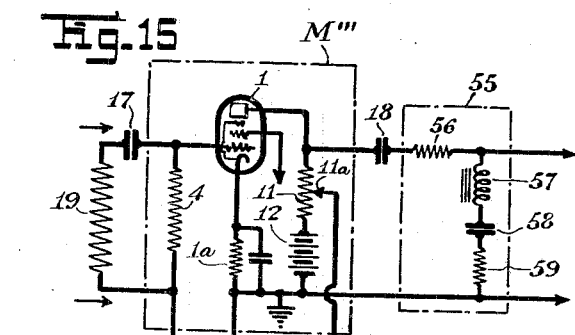
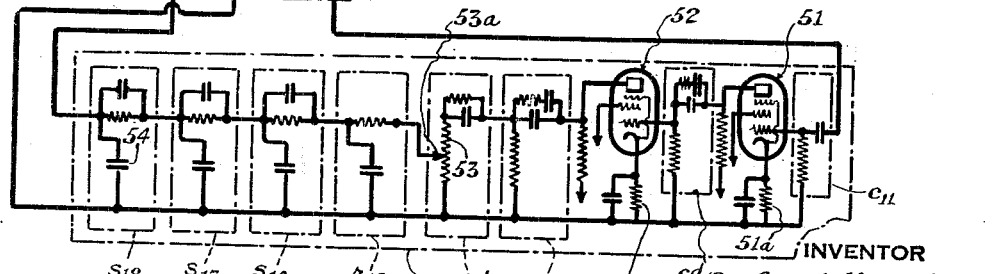

INVENTOR
George H. Fritzinger
BY Henry Lanahan
ATTORNEY

Patented Oct. 31, 1939

2,178,072

UNITED STATES PATENT OFFICE 2,178,072

BAND DISCRIMINATING MEANS AND METHOD

George H. Fritzinger, East Orange, N. J., assignor to Thomas A. Edison, Incorporated, West Orange, N. J., a corporation of New Jersey Application March 26, 1937, Serial No. 133,114

19 Claims. (Cl. 178—44)

This invention relates to the transmission of electric oscillations, and more particularly to means and methods for producing discriminations between different frequency bands in that transmission.

It is an object of the invention to provide improved and simplified means and methods for producing such discriminations.

It is another object to provide improved means for controlling such discriminations.

It is another object to provide means and methods for producing inter-band cut-offs characterized by regenerative peaks immediately adjacent the cut-off, or by the absence of those peaks, at will.

It is another object to provide means and methods for producing the effects of low-pass, high-pass, band-pass and band-elimination filters while avoiding one, some or all of the disadvantages of size, weight, bulk, cost, magnetic field-creation and susceptibility, insertion loss, and the like which characterize efficient conventional filters.

It is another object to provide combinations with conventional filter means of satisfactorily complementary apparatus.

It is another object to provide at a minimum of cost and complexity an amplifier with both automatic control of its output volume and effective band discrimination.

It is another object to improve the automatic control of output volume of an amplifier, particularly in respect of the speed of response.

It is another object to utilize inverse feed-back in association with an electronic amplifier for novel purposes and in an effective manner.

Other and allied objects will more fully appear from the following description and the appended claims.

In the description reference is had to the accompanying drawings, of which:

Figure 1 is a simplified schematic diagram of apparatus according to my invention;

Figure 2 is a representative system of polar coordinates for the graphical analysis of certain mathematical expressions to which I will have recourse;

Figure 3 illustrates a vector envelope for a type of reactance-resistance section employed in embodiments of my invention, of which type two forms are schematically illustrated in Figures $3a$ and $3b$, respectively;

Figure 5:
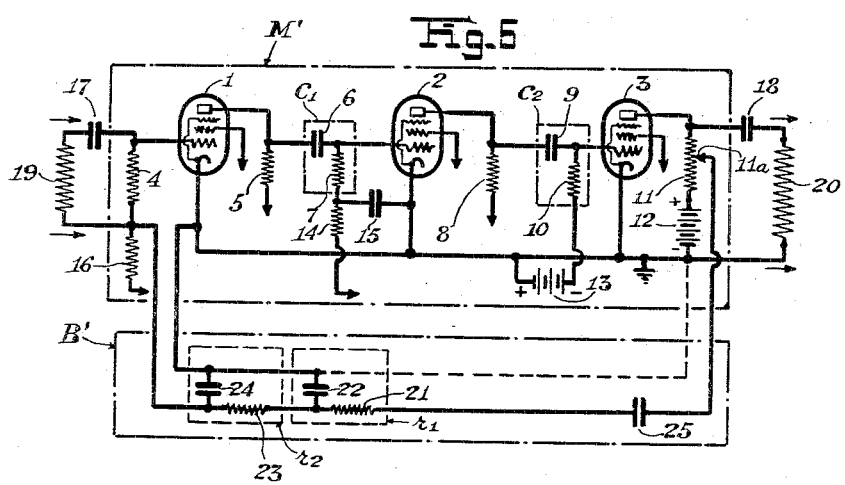
Figure 5 is a more complete schematic diagram of an embodiment of my invention.
Figure 7:
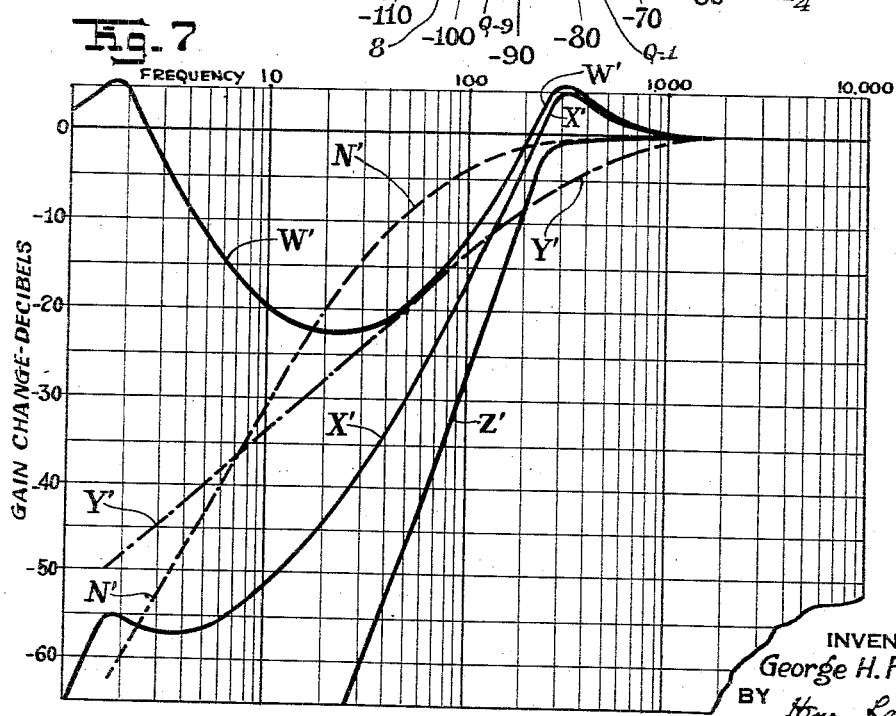
Figure 11:
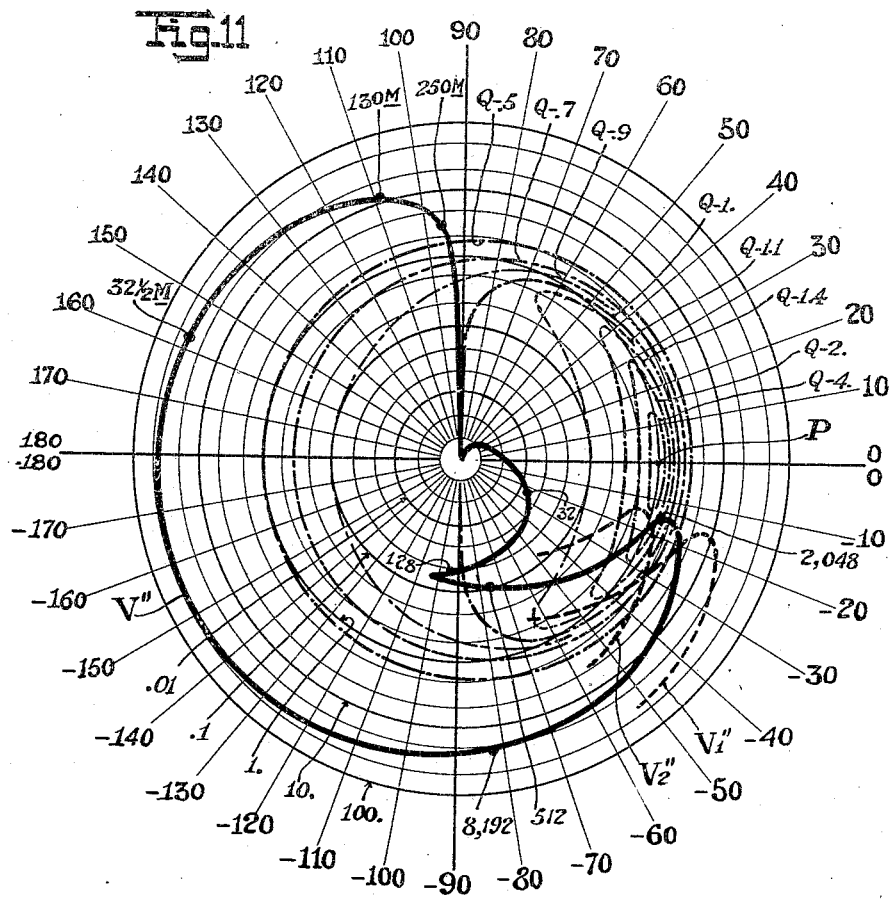
Figure 10:
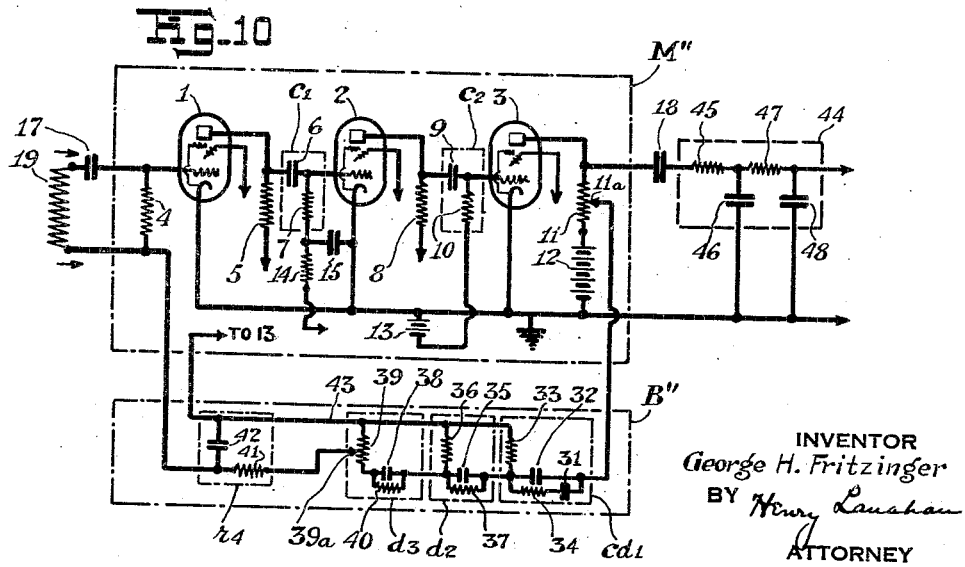
Figure 16:
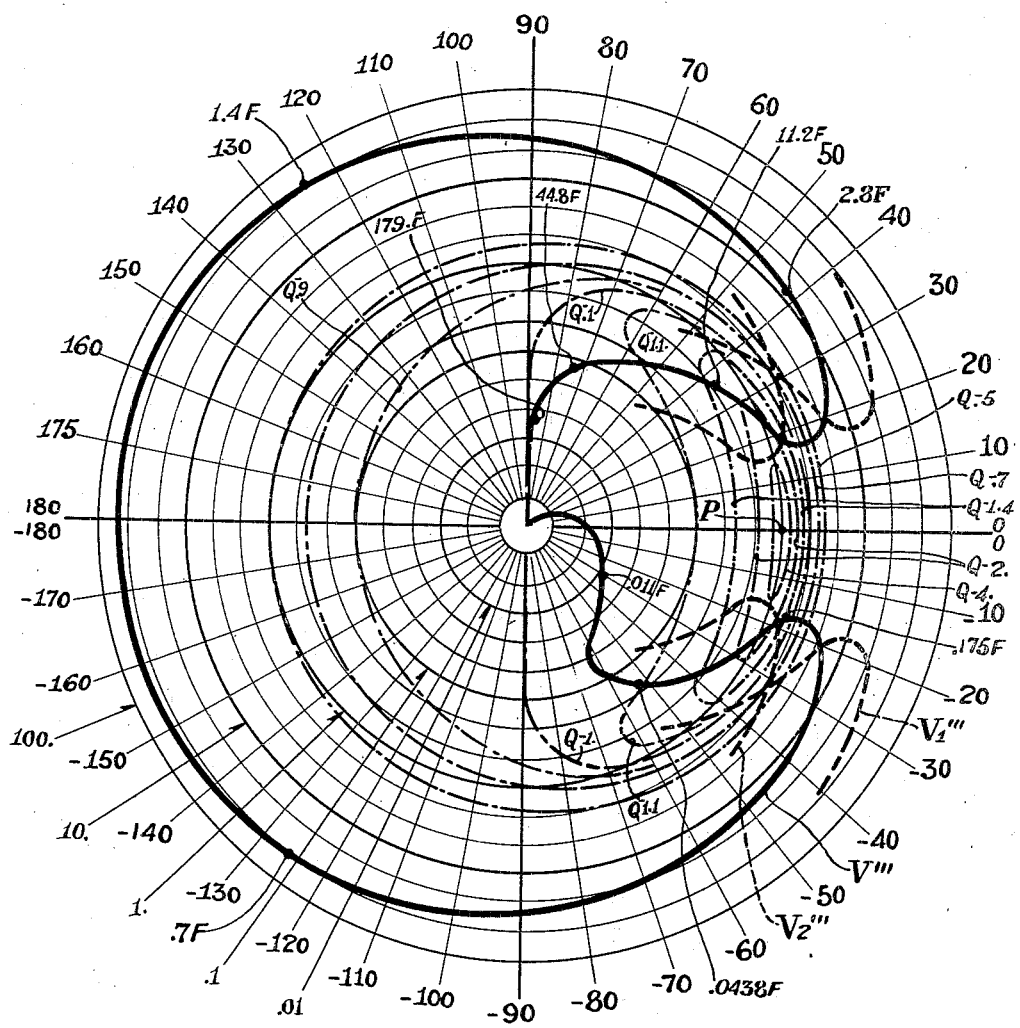
Figure 17:
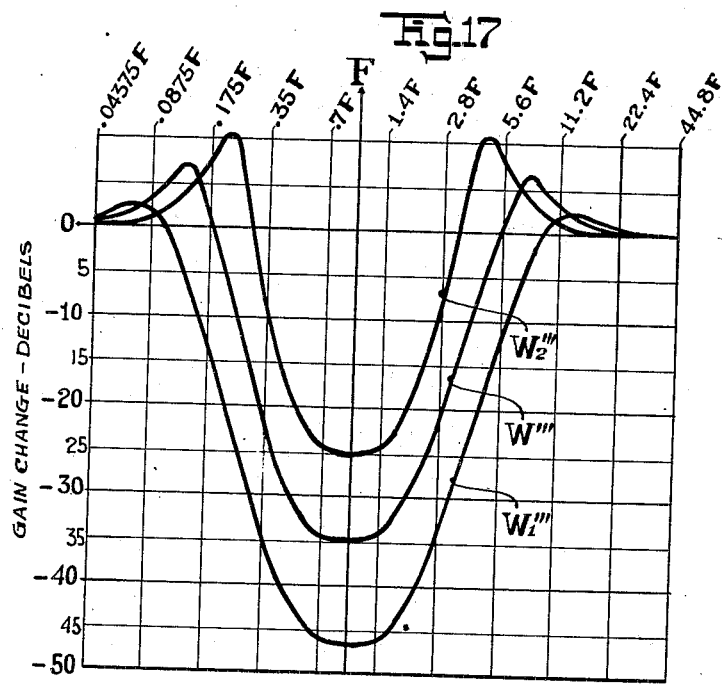

Figure 7 comprises a group of curves plotted against frequency and illustrating the band-discriminating action of the apparatus of Figure 5;

Figure 8 is a schematic view of a modified and elaborated embodiment of my invention;

Figure 9 illustrates a vector envelope for a further type of reactance-resistance section, of which a form is illustrated in Figure $9a$ and of which another form is illustrated in Figure $9b$;

Figure 10 is a schematic view of a further modified embodiment of the invention;

Figure 11 illustrates a vector envelope for Figure 10, assuming typical values;

Figure 12 comprises a group of curves illustrating the band-discriminating action of the apparatus of Figure 10;

Figure 13 comprises a group of curves illustrating the like action of that apparatus when there is included therein certain conventional filter means;

Figure 14 illustrates a vector envelope for still another type of reactance-resistance section, of which a form is illustrated as Figure $14a$;

Figure 15 is a schematic diagram of a still further modified embodiment of the invention;

Figure 16 illustrates a vector envelope for Figure 15;

Figure 17 comprises a group of curves illustrating the action of Figure 15; and

Figure 18:
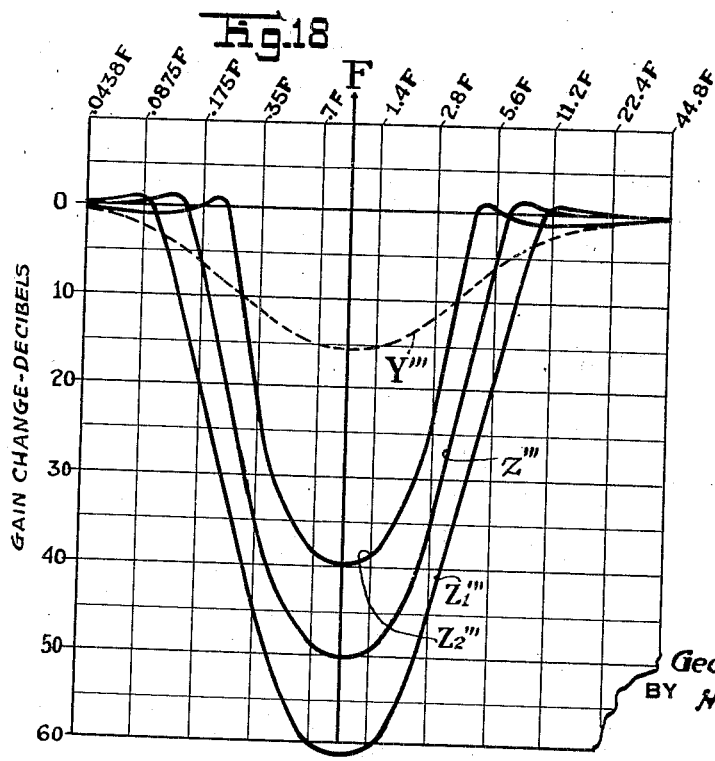

Figure 18 comprises a group of curves illustrating that action as augmented by simple conventional filter means.

My invention involves the use of inverse feed-back in an electronic amplifier—by which is meant oscillation feed-back, from an implifier point of higher oscillation level to one of lower oscillation level either degenerative or regenerative in character. To provide the most intelligent grasp of certain aspects of my invention it is desirable first briefly to review certain considerations now known in connection with such feed-back.

Momentary reference being had to the purely schematic Figure 1 of the accompanying drawings, there will be seen an amplifier A—typically, but not necessarily limitatively, a broad band audio frequency amplifier—connected between an oscillation source S and a load or work-circuit L, and having the portion M lying between the points $P_1$ and $P_2$ within A; there will further be seen a feed-back circuit B connected between these two points. It will of course be understood that $P_1$ may be the amplifier input, $P_2$ may be the amplifier output, or both or either of these points may be intermediate amplifier points, so long as $P_2$ is of the higher oscillation level. In this system it is convenient to denote as $\mu$ the propagation factor of the amplifier portion M, from the point $P_1$ to the point $P_2$ (i. e., the degree of amplification which this portion itself tends to effect between these points); and as $\beta$ the propagation factor of the feed-back circuit B, from the point $P_2$ to the point $P_1$. Each of these two factors will of course be understood in general to be a complex quantity and a function of frequency; each may therefore be represented as a vector—the two factors for example as vectors of respective absolute magnitudes $|\mu|$ and $|\beta|$ (the magnitude of each being capable of assuming values of greater or less than unity), and of respective angles $\psi$ and $\alpha$.

If $e_1$ represent the oscillation level (e. g., the voltage) at the point $P_1$, it will readily be understood that the oscillation level at the point $P_2$, or $e_2$, would in the absence of the feed-back circuit B be given by $$e_2 = \mu e_1 \quad (1)$$

With the circuit B present, it may be shown by successive approximations that $$e_2 = \mu e_1 (1 + \mu\beta + \mu^2\beta^2 + \mu^3\beta^3 + \ldots) \quad (2)$$

or, in unexpanded form, $$e_2 = \mu e_1 (1 - \mu\beta)^{-1} \quad (3)$$

Let $$\phi = \mu\beta \quad (4)$$

Then $$e_2 = \mu e_1 (1 - \phi)^{-1} \quad (5)$$

Accordingly it is readily understood, from a division of (1) by (5), that the quantity $(1-\phi)$ is an expression of the effect on the amplifier performance of the presence of the feed-back circuit B.

The absolute attenuating effect on amplifier gain, which effect would ignore phase shifts, is expressed as an attenuating factor or ratio by the absolute magnitude of the quantity $(1-\phi)$—i. e., by $|1-\phi|$. It is obvious that under any specific conditions which would render the attenuation ratio $|1-\phi|$ equal to unity, the feed-back circuit B would be without absolute effect on amplifier gain; it is also obvious that should $\phi$ equal unity and the attenuation ratio therefore equal zero, infinite oscillation level $e_2$ would tend to occur—which in practise means instability, and uselessness for all ordinary purposes, of the system. Further and more generic conclusions from Equation 5 are, however, most conveniently obtained by vector graphical means.

Since $\mu$ and $\beta$ are each representable as vectors, their product $\phi$ may likewise be represented as a vector—of magnitude $|\phi|$, which is of course the product of $|\mu|$ and $|\beta|$; and of angle $\theta$, when $$\theta = \psi + \alpha \quad (6)$$

In Figure 2 I have shown a system of polar coordinates wherein $\phi$ vectors may be laid off from the origin O; distance from the origin will arithmetically represent $|\phi|$ magnitude, and counterclockwise angular displacement from the line O—O' will represent $\theta$ value. Following usual practise there has been designated as I the quadrant traversed by the first 90 degrees counterclockwise rotation from O—O' about O, as II the quadrant traversed by the second 90 degrees rotation, etc. In Figure 2 there has also been indicated as P a point whose $|\phi|$ magnitude is 1.0 and whose $\theta$ value is zero; and particular information may be obtained as to system performance, at any frequency, from the relationship of the $\phi$ vector at that frequency to the point P, as is now explained.

The distance $d$ of the extremity of any such $\phi$ vector from the point P may be shown trigonometrically to be expressable in terms of the $|\phi|$ magnitude and $\theta$ value of that vector as follows:

$$d = \sqrt{1 + |\phi|^2 - 2|\phi|\cos\theta} \quad (7)$$

But, by the law of cosines as applied to vector analysis, $$\sqrt{1 + |\phi|^2 - 2|\phi|\cos\theta} = |1 - \phi| \quad (8)$$

Accordingly, from (7) and (8), $$|1 - \phi| = d \quad (9)$$

Substitution of (9) in (5) above results in a new form of (5), as follows:

$$e_2 = \mu e_1 d^{-1} \quad (5a)$$

This shows that the absolute attenuating ratio, expressing the absolute effect of the feed-back circuit B on amplifier gain, is simply $d$—in other words, if the $\phi$ vector for the system at any frequency be laid off from O in Figure 2, the distance of its extremity from P expresses the attenuating ratio at that frequency. It follows that at any frequency whereat the $\phi$ vector termination is separated from P by a distance of 1.0—i. e., lies on a circle Q—1. of radius 1.0 about P as a center—the feed-back circuit is without effect on absolute gain; in other words, the circle Q—1. is then a locus for the extremities of vectors having a 1.=times effect on absolute gain, and is the line of demarcation between the extremities of vectors respectively representing regenerative and degenerative effects of the circuit B. Any number of other circles about P may be drawn, such as I have shown as Q—.5, Q—.7, Q—.9, Q—1.1, Q—1.4, Q—2. and Q—4., each being the locus of vector extremities for gain effects in each instance indicated by the numeral contained in the designation. (It will be understood that while there may of course be drawn loci for progressively smaller fractions than .5—i. e., with radii progressively greater than 2.—the increasing radii of such loci tend to make them progressively more nearly coincident with circles of reciprocally corresponding radii about the origin O.)

While one particular condition for instability—that $\phi$ equal unity—was mentioned above as obvious, this is not the only condition which must be avoided to insure stability of a system of this character. A more complete statement of conditions for stability (set forth by Nyquist in a paper published in the Bell Telephone System Journal, Vol. XI, 1932, pp. 126-147) is that if the $\phi$ vectors for a system at all frequencies—useless as well as useful—be laid off in a plot of the character of Figure 2, a line joining the successive vector extremities (i. e., the "vector envelope"), starting at zero at zero frequency, shall return to zero at infinite frequency without intersecting or enclosing the point P, above defined. The considerations hereinabove reviewed will be referred to in connection with the description of my invention proper.

According to this invention, inverse feed-back is employed in association with an amplifier, in order and in manner to produce predetermined and, for example, sharp discriminations between different frequency bands in the transmission of oscillations through the amplifier—for the production of which band discriminations the usual means employed are wave filters or their equivalent serially incorporated in the oscillation-transmitting channel. As will hereinafter be evident, the apparatus which I add to a simple amplifier to produce this function may be of the simplest and cheapest variety—for example a combination, with condensers, of small and inexpensive resistors, contrasting with the relatively large, costly, and frequently (because of magnetic fields) troublesome inductances ordinarily employed in wave filters. Further, the apparatus which I add is placed in a portion of the system which is not part of the main oscillation-transmitting channel, so that insertion losses do not have to be accounted for as must be done with wave filters. Again, although the apparatus which I add may be of a type which, if itself employed in the main oscillation-transmitting channel, would result in inferior discrimination and high insertion loss characteristics, yet as employed according to my invention it is capable of producing the sharp band discrimination without insertion loss.

Broadly, I employ with an amplifier (e. g., with A, Figure 1), across a portion thereof (e. g., M) which may be either fractional or entire, a feedback circuit (e. g., B) having a propagation factor $\beta$ so related to the propagation factor $\mu$ of M, in both magnitude and phase characteristics with varying frequency, that the quantity $|1-\phi|$, or $d$ abovementioned, remains essentially constant in magnitude (for example at nearly unity, represented by a vector envelope lying within or nearly within the space between the loci Q—1.1 and Q—.9, Figure 2) over at least one frequency band, but varies sharply in relatively narrow frequency range at one or more of the band extremities to have through an adjacent band or bands far different magnitudes (typically higher ones, such action being represented by an outward passage of the vector envelope in the narrow frequency range to attain, and to maintain within the last mentioned band or bands, many times unity separations from P and hence from O). And I of course so relate the factor $\beta$ to the factor $\mu$ that the vector envelope of the system will not violate the condition, above set forth, for stability.

To select proper constants for the feed-back circuit B for a particular result, as well as to make the corrollary choice of an apt portion M of the amplifier for bridging with the circuit B, it is necessary to understand the behavior of the $\mu$ and $\beta$ vectors, with frequency change and generally. The $\mu$ vector, for example, is influenced by the frequency-discriminating constants of the inter-tube couplings or other reactance-resistance circuits or the like embraced within M; by the number of the repeater tubes within M; and by the amplifying ratios of the tubes (and transformers, if employed), and attenuating ratios of resistive attenuating means, within M. The term $\mu_0$ may be used to denote the product of all the amplifying and attenuating (or fractional-amplifying) ratios within M; these ratios are most conveniently considered as unmodified by frequency-discriminating constants (which are separately considered), and so the term $\mu_0$ is wholly a positive, real quantity. The term $\psi_0$ may be used to denote the fixed phase shift which tends to be established within the portion M, and from which phase displacements arising from the frequency-discriminating constants are reckoned; if M (without transformers) has an even number of repeater tubes $\psi_0$ will be zero, and if M has an odd number of tubes $\psi_0$ will be 180 degrees (and each transformer will add, to the value of $\psi_0$ otherwise prevailing, 180 degrees or zero degrees, according to its phasing, as will be understood). The terms $\mu_1$, $\mu_2$, etc., may denote the respective vectors of each reactance-resistance circuit or the like within M, these having of course the magnitudes $|\mu_1|$, $|\mu_2|$, etc., and angles, $\psi_1$, $\psi_2$, etc.; normal magnitudes of each of $|\mu_1|$, $|\mu_2|$, etc., and normal values of each of $\psi_1$, $\psi_2$, etc., from which frequency-discriminating effects create departures, will be 1.0 and zero, respectively. Accordingly:

$$\mu = \mu_0 \mu_1 \mu_2 \ldots \quad (10)$$
$$|\mu| = \mu_0 |\mu_1| |\mu_2| \ldots \quad (11)$$
$$\psi = \psi_0 + \psi_1 + \psi_2 + \ldots \quad (12)$$

The feed-back circuit B, as hereinafter more fully appears, will be formed of one or more of reactance-resistance circuits; and while in simpler embodiments it need not contain repeater tubes or transformers, it may on occasion contain such elements. So, in correspondence with the terminology adopted for the amplifier portion M, the term $\beta_0$ may be used to denote the product of all simple amplifying and attenuating ratios within B (having a value of 1.0 in simpler cases); the term $\alpha_0$ to denote the fixed phase shifts tending to be established within B (having a value of zero in simpler cases); and the terms $\beta_1$, $\beta_2$, etc., to denote the respective vectors of the several reactance-resistance circuits or the like within B, these having of course the absolute magnitudes $|\beta_1|$, $|\beta_2|$, etc., and the respective angles $\alpha_1$, $\alpha_2$, etc. Accordingly:

$$\beta = \beta_0 \beta_1 \beta_2 \ldots \quad (13)$$
$$|\beta| = \beta_0 |\beta_1| |\beta_2| \ldots \quad (14)$$

and $$\alpha = \alpha_0 + \alpha_1 + \alpha_2 + \ldots \quad (15)$$

From (4) and (10) through (15), it follows that $$\phi = [\mu_0 \beta_0][\mu_1 \mu_2 \ldots \beta_1 \beta_2 \ldots] \quad (16)$$
$$|\phi| = [\mu_0 \beta_0][|\mu_1| |\mu_2| \ldots |\beta_1| |\beta_2| \ldots] \quad (17)$$

and $$\theta = [\psi_0 + \alpha_0] + [\psi_1 + \psi_2 + \ldots + \alpha_1 + \alpha_2 + \ldots] \quad (18)$$

in all of which last three expressions the first bracketed term represents a simple fixed quantity; and in which respectively the second bracketed term represents a frequency-variable vector, its frequency-variable absolute value, and its frequency-variable phase angle.

Attention may now be directed to the nature of the individual frequency-variable vectors $\mu_1$, $\mu_2$, etc. and $\beta_1$, $\beta_2$, etc.; two elementary types of reactance-resistance circuits or sections which may be used in either or both M and B may receive primary attention. A first such type of circuit or section, usually employed for inter-tube coupling in amplifiers, is of either the series-capacity, shunt resistance form or (for example in the case of transformer coupling) of the series-resistance, shunt inductance (e. g., tube-plate-resistance, transformer-primary-inductance) form. I have designated both these forms broadly as of one type—a "c-section"—for, if $T_c$ be employed to denote 6.28 times the RC product for the former or 6.28 times the L/R quotient for the latter (T being $2\pi$ times the so-called "time constant", and C, R and L being of course expressed in farads, ohms and henries, respectively), they are found to have mutually identical vector characteristics when frequency is expressed as a multiple of $T_c^{-1}$. I have shown as Figure 3 the vector envelope $V_c$ for a $c$-section; and as Figures 3$a$ and 3$b$ simple schematic illustrations of the two forms of this type of section, $C_c$ denoting capacity, $R_c$ resistance, and $L_c$ inductance (for example transformer primary inductance). It will be noted from Figure 3 that the vector of a $c$-section starts at zero magnitude and $+90$ degree angle at zero frequency; with increasing frequency it rotates clockwise through the first quadrant, with magnitude increasing at first in proportion to frequency and then at a progressively decaying rate to a magnitude limit of unity, and with angular change per octave (2:1) frequency change at first infinitesimal, increasing to a maximum around $+45$ degrees, and then progressively decaying to infinitesimal in the limit of zero degrees.

In order effectively to show a wide variation of vector magnitude, Figure 3, as well as succeedingly numbered figures, has been plotted with radial dimensions laid off logarithmically from the outermost circle (representing in this case unity). In Figure 3 this logarithmic basis has been observed down to the innermost circle (representing in this case .0002), from which value to the center of the plot it is permissible to consider the showing as arithmetic.

The other elementary type of reactance-resistance circuit or section is of the series-resistance, shunt-capacity form or of the series-inductance, shunt-resistance form. I have designated both these forms broadly as of one type— an "$r$-section"—for, if $T_r$ be employed to denote 6.28 times the RC product for the former or 6.28 times the L/R quotient for the latter, they are found to have mutually identical vector characteristics when frequency is expressed as a multiple of $T_r^{-1}$. I have shown as Figure 4 the vector envelope $V_r$ for an $r$-section; and as Figures 4$a$ and 4$b$ simple schematic illustrations of the two forms of this type of section, $C_r$ denoting capacity, $R_r$ resistance, and $L_r$ inductance. It will be noted from Figure 4 that the vector of an $r$-section starts at unity magnitude and zero angle at zero frequency; with increasing frequency it rotates clockwise through the fourth quadrant, with magnitude diminishing at first infinitesimally but then at an increasing rate up to proportionality with frequency, and with angular change per octave frequency change at first infinitesimal, increasing to a maximum around $-45$ degrees, and then progressively decaying to infinitesimal in the limit of $-90$ degrees.

Figure 4:
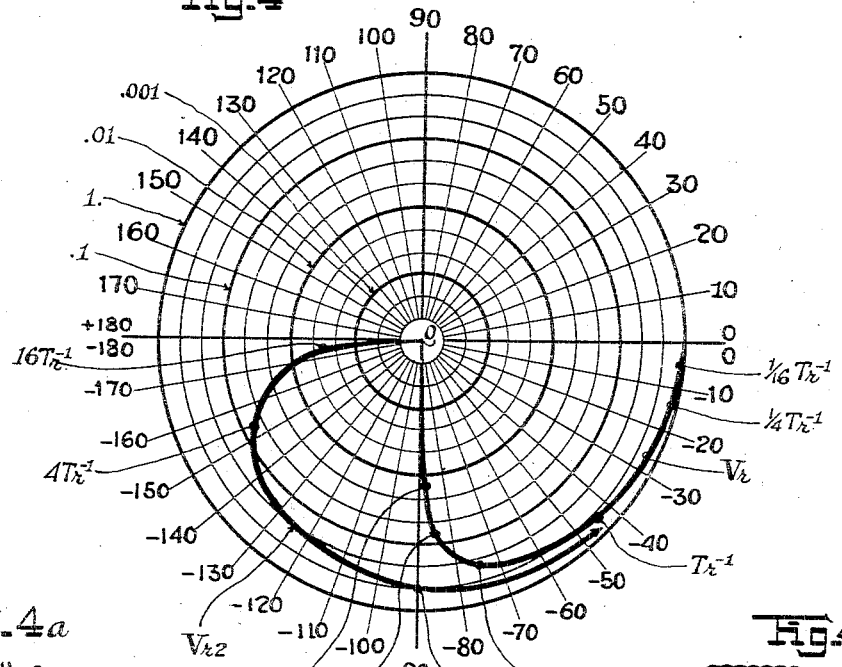
Figure 4 illustrates a vector envelope for another type of section, of which two forms are illustrated in Figures $4a$ and $4b$, respectively.
Figure 4A:
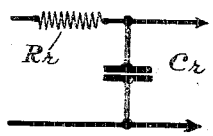
Figure 4B:
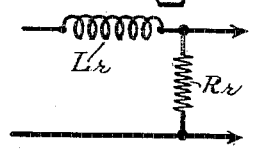

When either type of section is pluralized by arrangement of $n$ sections in tandem, for example with intervening amplifier tubes or other effective isolating means, the vector envelope of the combination may of course be determined by raising the magnitudes at each frequency to the $n$th power and multiplying each corresponding angle by $n$. When the pluralizing is effected by arrangement in immediate tandem, without intervening isolating means, the resulting vector envelope may be approximated by the same procedure (the aproximation being especially nearly accurate if the impedance values of the elements in each succeeeding section be made multiples of the corresponding ones of the preceding section, which of course may be done without disturbance of $T_c$ or $T_r$ values). In Figures 3 and 4 I have shown by way of example the vector envelopes $V_{c2}$ and $V_{r2}$, of two $c$-sections and of two $r$-sections, respectively; should somewhat different $T_c$ or $T_r$ values be employed in successive sections, these envelopes are still approximately correct when $T_c$ or $T_r$ is taken as the mean of the $T_c$ or $T_r$ values for the several sections.

Figure 6:
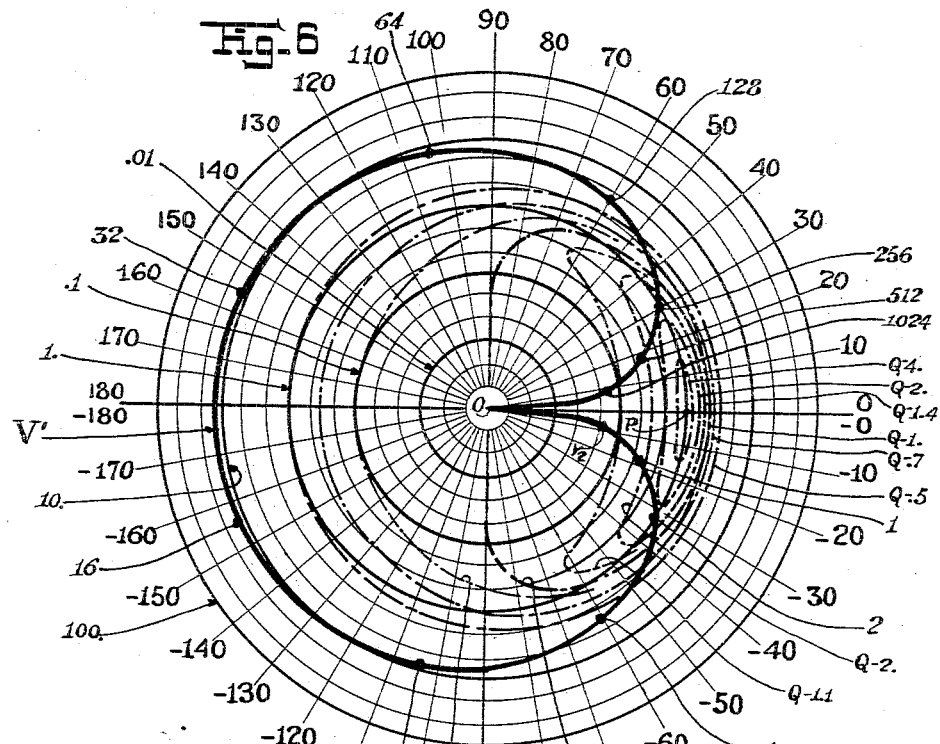
Figure 6 illustrates the vector envelope of a significant portion of the system of Figure 5 when typical values are assigned to its components.

I may now proceed to show, in Figure 5, the structure of a simple embodiment of my invention, wherein sections of each of the described types are employed; and to show in Figures 6 and 7 characteristics which the system may possess with typical values assigned to various of its components. In Figure 5 there appear, forming the amplifier portion M', three amplifying or repeater tubes 1, 2 and 3 with their immediately associated apparatus. Thus a grid leak for tube 1 appears as 4; a plate load resistance for this tube as 5; grid condenser and leak for tube 2 as 6 and 7, respectively; plate load resistance for tube 2 as 8; grid condenser and leak for tube 3 as 9 and 10, respectively; and plate load resistance for tube 3 as 11, for example in the form of a potentiometer having variable contact 11$a$. The tubes, which have non-limitatively been illustrated as of the pentode variety, may be supplied with grid biasing, screen and plate potentials in any convenient manner. For supplying the plate potential of tube 3 I have shown a battery or other current source 12 connected between ground (for example, a common cathode connection) and the plate return for tube 3 (i. e., the lower end of resistance 11); and it will be understood that the plate and screen returns generally may if desired be connected to points on this source 12, the drawing having been simplified by the use simply of arrow-heads to denote appropriate connections. For supplying the grid-biasing potential to tube 3 I have shown a battery or other potential source 13 connected between ground and the grid return for this tube (i. e., the lower end of grid leak 10); and it will be understood that the grid returns generally may if desired be ultimately connected to points on this source. I have, however, illustrated in the grid return of tube 2 a bias filter comprising series resistance 14 and capacity 15 shunted from the junction of 14 and 7 to ground; and for the grid return of tube 1 I have partially shown, by the analogous resistance 16, a bias filter of which the balance will be later mentioned. Input and output condensers 17 and 18 have been shown for coupling respectively earlier and later amplifier portions (or source and load) into and out of amplifier portion M'; these earlier and later portions (or source and load) have been typified as the resistances 19 and 20, respectively.

The amplifying operation of this portion of the system will be obvious to one skilled in the art, and need not here be detailed. It may be pointed out, however, that M' contains two $c$-sections as above defined—6—7 and 9—10, which I have designated as $c_1$ and $c_2$, respectively. And it will be understood that no limitation to this particular form of $c$-section is intended.

I have shown a feed-back circuit B' connected between the resistor 11, specifically contact 11$a$, and the input circuit of tube 1. This feed-back circuit consists essentially of two $r$-sections, $r_1$ and $r_2$, comprising the respective series resistances 21 and 23 and the respective shunt condensers or capacities 22 and 24. The final capacity (24) is conveniently connected to form, as well as a portion of $r_2$ and thus of B', the condenser which completes the bias filter for tube 1 (analogous to 15 for tube 2)—i. e., from the junction of 4 and 16 to ground. In series with resistance 21 may be connected a blocking condenser 25;

this has no qualitative effect on the section $r_1$, and its quantitative effect may be rendered negligible by choice of its value at many times that of condenser 22.

It will be understood that the circuit B' will feed back oscillations from the resistance 11 to the tube 1 input circuit, with respective amplitude reductions and phase shifts at different frequencies determined by the vector characteristics (e. g., $\beta_1$, $\beta_2$) of the sections $r_1$ and $r_2$; the true effect of the circuit B' on amplifier performance, however, will be understood from the considerations set forth hereinabove to be a function not only of these vector characteristics, but also of those of the amplifier sections $c_1$ and $c_2$ and of the various quantities in expressions (17) and (18) which are provided with zero subscripts. In other words the feed-back circuit and amplifier portion thereby bridged together form a local circulatory system for oscillations, of all of which circulatory system the parameters are of importance in determining the effect of the feed-back circuit.

By choice of the values of the component resistances and capacities of the several sections, I may for example make the value of $T_r^{-1}$ (for the tandemed sections $r_1$ and $r_2$) a fraction, such as ⅛, as great as that of $T_c^{-1}$ (for the tandemed sections $c_1$ and $c_2$); if on this basis the vector envelopes (e. g., $V_{c2}$ and $V_{r2}$) for the two pairs of sections be combined in the obvious manner, the form of the resulting vector envelope is that of the envelope V' of Figure 6. This will be observed to reach its maximum magnitude intermediate its extremities; but no matter what that maximum magnitude may be, an unwanted enclosure of the point P (above described in connection with Figure 2 and analogously appearing in Figure 6) by the envelope is entirely avoided by the 180 degree value of ($\psi_0+\alpha_0$). $\psi_0$ is 180 degrees as a result of the odd number of tubes within M, and $\alpha_0$ is zero degrees; their 180 degrees sum causes the vector envelope V' to start at zero frequency in the fourth quadrant, rather than in the second as it would were ($\psi_0+\alpha_0$) of zero value. From this start, at zero magnitude and zero angle, the envelope passes as frequency increases through the fourth and third quadrants with increasing magnitude, and through the second and first quadrants with decreasing magnitude to end at zero magnitude and zero degrees in the first quadrant at infinite frequency. V' has been plotted, simply by way of example, with a specific frequency of 64 cycles assigned to $T_c^{-1}$; and with a frequency of ⅛ this value, or 8 cycles, assigned to $T_r^{-1}$.

The plotting of V', Figure 6, has been carried out with the logarithmic radial dimensioning above discussed; and it will therefore be appreciated that the loci (Q—.5, Q—.7, Q—.9, Q—1., etc.) of Figure 2 will not appear in Figure 6 in circular form. They have, however, been shown in dash-dot lines in their forms appropriate to the logarithmic dimensioning, and respectively designated (excepting that in the interest of clarity Q—.9 and Q—1.1 have been left incompleted in their right-hand portions, which will however be understood to be respectively just within and just without, and both parallel with, the corresponding poriton of Q—1.). By appropriate choice of the value of $\mu_0\beta_0$, which uniformly regulates the magnitudes of all the vectors and so will move each point on the envelope inwardly or outwardly by a uniform distance, the envelope may be made to lie between the loci Q—1. and Q—1.1—representing substantially no influence of circuit B' on amplifier gain—for wide frequency bands at both extremities; and then in both higher and lower frequency portions to cut sharply out through the loci Q—1., Q—.9, Q—.7, Q—.5 in narrow frequency range, to assume over a several octave intermediate band wide separations from O and P—representing a great gain-attenuating effect of circuit B'. It may be made, however, before this cutting out to pass in a very narrow frequency range over one or more of the loci Q—1.1, Q—1.4, etc., and inversely back thereover—as I have illustrated in Figure 6 (wherein $\mu_0\beta_0$ has been by way of example taken as 1,000) by the envelope passages across Q—1.1 and Q—1.4, its touchings of Q—2, and its re-passages across Q—1.4 and Q—1.1 before its outward excursions; this will represent a more or less noticeable regenerative peak on each side of the attenuated band.

In determining the value of $\mu_0\beta_0$ the circuit B' has in this case only a unity effect (i. e., $\beta$ equals 1.)—excepting to the extent of a slight decrease of this value which may be occasioned by the effective shunting of the resistance 16 across the condenser 24, which decrease is minimized by the desirable choice of a value for 16 many times that of 23. The value of $\mu_0$, and therefore of $\mu_0\beta_0$, may be regulated by choice of position of the contact 11a, or by any operation influencing the normal gain of the amplifier portion M' whereby the oscillation level at the contact 11a is affected, such as volume control adjustment within M'.

In the central portion of Figure 6 the effect of the circuit B' on amplifier gain may be read at different frequencies from the relationship of the several frequency points on the envelope V' to the several indicated loci; in the outer portion the effect on gain may be correspondingly read (with error of less than 1 db., or decibel) by taking the circle about O of magnitude .1 as a locus of gain reduction to .1, the circle about O of magnitude .01 as a locus of gain reduction to .01, and intermediate and more outward circles in logarithmic proportion. From such a reading a curve of the circuit B' effect on amplifier gain may be plotted against frequency, such as I have plotted in Figure 7 as W' from the envelope V' of Figure 6.

The curve W' shows that the particularly illustrated system has produced fundamentally a band-elimination filter action; but since the restoration to normal amplifier gain at one frequency extremity (i. e., the lower) occurs in a region wherein amplifier gain has been stringently curtailed by two ($c_1$ and $c_2$) of the very sections which produce the action, there has been provided in practise a low-frequency cut-off, or high-pass filter action. To indicate this graphically I have shown as N' a curve of the simple and normal effect on the gain of the amplifier portion M, of the presence of the sections $c_1$ and $c_2$ therein; and as X' a curve of the gain (i. e., the relative gain at different frequencies) of the amplifier portion M' taking into account the normal curve N' and the circuit-B'-effect curve W'.

In the plotting of the curves of Figure 7 the vertical dimensioning has been carried out in decibels according to well-understood practise, wherein 20 db. represents a 10-times change of gain, and other gain changes are correspondingly represented logarithmically.

For convenience I may refer to cut-offs immediately following a significant regenerative peak, such as the cut-offs of curves W' and X' around 256 cycles, as regenerated cut-offs; and to cut-offs not following such a peak, such as the cut-off of curve Z', as unregenerated cut-offs.

According to my invention the band-discriminating effects produced by inverse feed-back may when desired be combined with those of filter means, either simple or complex, serially disposed with but outside of the amplifier portion (e. g., M or M') bridged by the feed-back circuit, to produce modified and further sharpened cut-offs—and this is a particularly favorable arrangement when the parameters, as in the example just described, have been so chosen as to produce a regenerative peak. In this example, reference being had back to Figure 5, the condenser 18 and resistance 20 may together be considered as a simple such filter means; and if this combination be assumed to have a $T^{-1}$ (T being 6.28 times the RC product) value of 8 $Tc^{-1}$, or 512 cycles, its transmission-frequency characteristic is given by the curve Y' in Figure 7. The superposition of the curves X' and Y'—representing the combined effect of the amplifier portion M' with its inverse feed-back circuit B' and the filter means 18—20—appears in Figure 7 as the curve Z', which shows a very sharp and favorable 256-cycle cut-off produced by the combination.

While it will of course be understood, and is hereinafter more fully developed, that my invention is not limited to particular numbers and types of reactance-resistance sections or to the production of any one particular type of band discrimination, I desire here to point out its flexibility even with given numbers and types of sections and given band-discriminating objective. By way of example of this characteristic I have shown in Figure 8 an amplifier portion $M_1'$ modified from that of Figure 5 in that only two tubes are employed, the tube 3 being omitted and the tube 2', replacing tube 2, for example of triode form; the $c$-section $c_2$ of Figure 5 is replaced by a $c$-section $c_2'$ comprising a transformer 27; and the plate load resistance 11 of Figure 5 is replaced by a transformer-secondary-shunting resistance 11', for example with variable contact 11a'. The transformer is so poled as to bring the instantaneous potentials at the top of resistance 11' in phase with the corresponding potentials on the grid of tube 2', thereby functioning to keep the value of $\psi_0$, in spite of the use of only two tubes within $M_1'$, at 180 degrees. The resistance 20, typifying broadly further amplifier portions or the like, may be connected across the secondary of the transformer 27 (if desired without the intermediary of condenser 18, although this has been retained in the showing of Figure 8).

The feed-back circuit, $B_1'$, may again comprise the two $r$-sections $r_1$ and $r_2$, but need not in this instance contain the blocking condenser 25. And in this case the bias filter resistance 16 for tube 1 may be omitted, and the bias for that tube fed serially through the circuit $B_1'$, by virtue of a connection of the lower transformer secondary extremity to the negative terminal of the biasing battery or other potential source 13. In spite of the change of structure, results may be secured from this system quite similar to those secured from the system of Figure 1. A second-order qualification which may be pointed out is that in view of the loading of the secondary of transformer 27 by resistances 11' and 20, the value of R for use with the primary inductance L in determining $T_c$ for the section $c_2'$ should be considered as the plate impedance of tube 2' plus transformer primary resistance, effectively paralleled by $u^{-2}$ times the resistance of 11' and by $u^{-2}$ times the resistance of 20, where $u$ represents the primary-to-secondary voltage step-up ratio of the transformer. Another second-order qualification is that in view of the inherent capacity of the transformer windings, the nature of the section $c_2'$ may change at very high frequencies to result in greater complexity than that of a simple $c$-section; but this change will affect only the high frequency extremity of the envelope V' in Figure 6, very near O and in the region where it in any event lies in the negligible-gain-change region between Q—1. and Q—1.1—so that the curves of Figure 7 will not be noticeably affected.

According to my invention, there may be made common with the feed-back circuit (e. g., with $B_1'$), to as great an extent as desired, the filter circuit for automatic volume control means which function to reduce amplitude contrasts in the signal oscillations passing through the amplifier. Such means, with full community of its filter circuit with the circuit $B_1'$, I have illustrated for example in Figure 8, selectively connectible into the system by means of a switch 28 which has in the description so far been assumed open. This switch may be connected simply from the contact 11a' to the anode of a diode rectifier 29, of which the cathode is connected to the lower extremity of resistance 11, either directly or through a battery or other potential source 30 which tends to bias the cathode positively.

With the switch 28 closed, and momentarily assuming a zero voltage of source 30, it will be seen that alternate half-cycles of the oscillations across the lower portion of the resistance or potentiometer 11' will be quite effectively shorted out by the diode 29—which will be recognized as arranged in the so-called shunt automatic volume control connection. In other words, the value of the lower potentiometer portion is reduced, but asymmetrically within each cycle; accordingly the voltage fed through the filter circuit will be at least substantially unidirectional. The diode 29 is so poled that this unidirectional voltage is of polarity to increase the negative bias on tube 1, temporarily reducing its gain and that of the amplifier portion $M_1'$ and so that of the entire amplifier, thus automatically reducing volume or signal-oscillation-amplitude contrasts. Finite voltages from the battery or source 30 are employed to provide a threshold value which the peak amplitude of oscillations across the lower portion of 11' must exceed before this action will take place, and thus a threshold of volume below which this automatic control will not occur.

Since the value of the lower half of the potentiometer 11' is at times reduced but never raised, some upward contact 11a' re-adjustment may be desirable to keep an average predetermined effective value of $\mu_0\beta_0$. Because of the asymmetric action, some distortion of the feed-back oscillations will take place; but this is largely equivalent to the introduction of harmonics, which are of course to greater extent than fundamentals filtered out by the $r$-sections. Broadly, the system is one of great simplicity and economy of components; and the time constants of $r_1$ and $r_2$ may be significantly less than would be permissible, on account of stability, in a random automatic volume control arrangement. Thus at the same time that desirable frequency-discriminating actions between bands are produced as above described, the signal advantage is obtained of an automatic volume control system of greater than usual speed of action, or immediacy of response. In the interest of simplicity I have shown only a typical A. V. C. arrangement, and this only in the one Figure 8; it will be understood, however, that a wide variety of A. V. C. arrangements may be incorporated in a wide variety of different systems according to my invention—and that the degree of community between filter circuit and feed-back circuit may be reduced to as little as community of the terminal condensers of the two (e. g., 24).

I have so far shown band-elemination filter action, producing a high-pass effect, by means of inverse feed-back; I shall now proceed to show and describe a system with band-eleminating action but producing a low-pass effect. In so doing I shall bring out further typical variations of section and system arrangement; it will be understood, however, that these are not limited in utility simply to low-pass systems, nor in turn is their use a necessity in low-pass systems according to my invention.

One of these typical variations is the use of a modified type of section whose vector envelope will not traverse a full 90 degrees in frequency swing from zero to infinity; instead it will both start and end at finite amplitudes at both zero and infinite frequency, and during the frequency swing will travel some fraction of 90 degrees and then back again, with its maximum change of magnitude per octave frequency change taking place in and near the region of its direction reversal. An advantage of the use of such a section is the ability readily to use a larger number of sections in the combination of M and B (normally in B) without entailing a traversal of so many quadrants by the vector envelope of the system that there becomes difficult the avoidance of enclosure of the point P (i. e., maintenance of stability)—the advantage of the larger number of sections being in turn a greater possible sharpness of cut-off. One such section may comprise a series capacity and shunt resistance fundamentally arranged (as in Figure 3a) as a $c$-section, but modified in that the capacity is shunted by an auxiliary resistance of value preferably at least several times that of the shunt resistance. In Figure 9 I show the vector envelope $V_d$ possessed by such a section when the value of the auxiliary resistance is made 10 times that of the shunt resistance; and in Figure 9a I show a simple schematic illustration of such a section, $C_c$ representing the series capacity, $R_c$ the shunt resistance, and $R_d$ the auxiliary resistance. I shall refer to such a section as a "$d$-section"; but it will be understood that its $T_c$ value (calculated from the values of $C_c$ and $R_c$) is still used in expressing frequency for the envelope $V_d$.

The shunting of $R_d$ around the capacity $C_c$ of course prevents the latter from performing any direct-potential isolating function, which in cases may be desirable; this defect in such a case may be cured by the use of a relatively large blocking or auxiliary capacity $C_d$ in series with the paralleled $C_c$ and $R_d$, or in series only with $R_d$. I have shown the latter arrangement in Figure 9b, and have designated the resulting section as a "$cd$-section"; and in Figure 9 I have included as $V_{cd}$ a vector envelope of such a section, calculated on the basis that $C_d$ is of 50 times the capacity of $C_c$. This will be seen to go, like the envelope of a simple $c$-section, to zero magnitude at zero frequency—but in this case only after having performed over a large frequency range like the envelope $V_d$ of the $d$-section.

Figure 10 illustrates a system for producing a low-pass effect wherein the bridged amplifier portion, M'', is essentially similar to the portion M' of Figure 5; in this case, however, the band to be eliminated is a high frequency one, and in its elimination the inter-tube coupling means, or sections $c_1$ and $c_2$, can obviously play a negligible part in view of their necessary $T_c^{-1}$ values at low frequency. It therefore becomes necessary to provide all the active sections in the feed-back circuit B''. Fundamentally it is a $c$-section of appropriately high $T_c^{-1}$ value which will produce the here-desired high frequency cut-off, and in B'' I have provided three of them— one modified into a $cd$-section and two into $d$-sections, and successively designated as $cd_1$, $d_2$ and $d_3$. Their components may be identified as the series capacities 32, 35 and 38, respectively shunted by the auxiliary resistances 34, 37 and 40, and respectively feeding into the shunt resistances 33, 36 and 39, with the auxiliary capacity 31 in series with 34. The $cd$-section (as well of course as the $c$-section within M'') will insure the termination of the vector envelope of the system at zero at zero frequency; but to provide the necessary termination at zero at infinite frequency I may include in B'' at least one $r$-section, such as I have illustrated as $r_4$; it may comprise the series resistance 41 and shunt capacity 42. The connection of 41 to 39 may be made if desired to a movable contact 39a on the latter, providing in B'' as well as in M'' a control of $\mu_0\beta_0$ value. The return lead 43 for all the shunt elements of B'' may be connected to biasing potential source 13 (and bias filter resistance 16 of Figure 5 omitted), to provide bias for tube 1 through shunt and series resistance elements in B''.

The sections $c_1$ and $c_2$ will of course have a $T_c^{-1}$ value at low frequency, typically 64 cycles. The cut-off frequency region for the system will be fixed as desired by choice of the $T_c^{-1}$ values for the $cd$-section and two $d$-sections; and for cut-off in the region of 2,000 cycles this value may typically be 8,192. The $T_r^{-1}$ value for the section $r_4$ will have the least harmful effect on the sharpness of cut-off if it is made higher than the last-mentioned value, and it accordingly may typically be 16,384. With these values, with a value of 180 degrees for $(\psi_0+\alpha_0)$ resulting from the odd number of tubes within M'', and with a $\mu_0\beta_0$ value of 95 established by adjustment of contacts 11a and 39a, the vector envelope of the system may be determined and has been shown as V'' in Figure 11. From this, in manner which will be understood from the case of Figures 6 and 7, a curve of effect on amplifier gain at various frequencies may readily be derived, and has been shown as W'' in Figure 12. In Figure 11 there has been shown as $V_1''$ a portion of the envelope as re-positioned by a change of $\mu_0\beta_0$ to 300, and as $V_2''$ a portion of the envelope as re-positioned by a change of $\mu_0\beta_0$ to 30—it being understood that the illustration of the entire re-positioned envelopes has been omitted simply in the interest of clarity. In Figure 12 there appear as $W_1''$ and $W_2''$ the respectively corresponding curves of effect on amplifier gain. The three curves $W_2''$, W'' and $W_1''$ nicely point out the control of cut-off frequency, as well as of regenerative peak amplitude, which may be effected by change of $\mu_0\beta_0$ value (e. g., either by $11a$ or $39a$ or both); it will be of course understood that by this control is meant one which may readily be performed with an existing system—for both cut-off frequency, and absence or presence in various amplitudes of regenerative peak, will be understood to be under complete control in the initial choice of system parameters. For example as to the regenerative peak, it will readily be appreciated that by the omission of one of the $d$-sections from the system of Figure 10, the "finger" of its vector envelope (V'', Figure 11), carrying the frequency 2,048 near its tip, would be made to extend some 50 or 60 degrees less counter-clockwise and would therefore not cut through the regeneration-representing region near the point P.

To show a combination of the effect of the inverse feed-back system of Figure 10 with conventional filter means, I have shown in that figure filter means 44 typically comprising two series resistances 45 and 47 and respective shunt capacities 46 and 48 therefor, serially connected in the oscillation-transmitting channel. Figure 13 shows a curve Y'' of the effect of this filter means (when each RC product therein is taken as providing a $T_r^{-1}$ value of 2,048 cycles) on the frequency characteristic of the system. In Figure 13 I have also included curves $Z_2''$, $Z''$ and $Z_1''$, showing the superpositions of the curve Y'' on curves $W_2''$, $W''$ and $W_1''$ respectively. These curves, with negligible regenerative peaks, point out the very sharp and favorable cut-offs produceable by this combination—as in foregoing cases, an inductanceless one. They further show the possibility of controlling cut-off frequency alone, over a wide frequency range, by the mere control of the $\mu_0\beta_0$ value.

I shall now proceed in Figure 15 to illustrate a purely typical system whereby a band-elimination action is provided with restoration of the amplifier gain both above and below the eliminated band. In so doing I shall by way of example illustrate still further variations of sections and system arrangement, which will be understood, however, to have no necessary specific relationship to this particular system.

A type of section which is illustrated in Figure 15 is an $s$-section—an $r$-section modified in manner analagous to that in which the $c$-section was modified to form the $d$-section, and for analagous benefits. The $s$-section, illustrated in Figure 14a, may comprise fundamentally an $r$-section with series resistance $R_r$ and shunt capacity $C_r$, around the resistance $R_r$ of which is shunted the auxiliary capacity $C_s$; its vector envelope, taking $C_s$ as of 10 times the reactance (1/10 the capacity) of $C_r$, is illustrated as $V_s$ in Figure 14, from which analogy to the $d$-section will be further apparent.

In Figure 15 I have illustrated the feed-back circuit B''' bridged around an amplifier portion M''' comprising only a single tube 1, and therefore including no reactance-resistance sections of its own; it will be understood, however, that this is illustrative only, as the presence of typical inter-tube coupling sections in M''', having $T_c^{-1}$ values many times below those involved in B''', would have an effect only on the low-magnitude, low-frequency extremity of the vector envelope where no significant influence would be felt therefrom. In Figure 15 I have also shown amplification in B'''—desirably by two tubes, 51 and 52, in view of the single tube in M''', in order that $(\psi_0+\alpha_0)$ may be preserved at the convenient 180 degrees. I have also by way of variation shown each of the tubes as self-biased—e. g., having their cathodes raised in potential above ground by respective by-passed bias resistances $1a$, $51a$ and $52a$.

The feed-back circuit B''' has been shown as comprising four sections—$c_{11}$, $cd_{12}$, $cd_{13}$ and $d_{14}$—directed to the production of the lower frequency cut-off and respectively of the types indicated by their designations; and four sections—$r_{15}$, $s_{16}$, $s_{17}$ and $s_{18}$—directed to the production of the higher frequency cut-off and respectively of the types indicated by their designations. The section $c_{11}$ (as well as $cd_{12}$ and $cd_{13}$) and the section $r_{15}$ insure zero magnitude termination of the vector envelope at both zero and infinite frequency extremities, respectively. The tube 51 may be interposed between the sections $c_{11}$ and $cd_{12}$, and the tube 52 may be interposed between the sections $cd_{12}$ and $cd_{13}$. The shunt resistance 53 of the section $d_{14}$ may be provided with a variable contact $53a$ from which the section $r_{15}$ may be fed, permitting an adjustment within B''' of $\mu_0\beta_0$ value. The return of the shunt elements in B''' may be simply to ground; and the lower end of grid leak 4 may be connected to the output condenser 54 of the final section $s_{18}$, the grid return for bias of tube 1 thus being through series and shunt resistances within B'''.

If F is taken as representing the mean frequency of the band to be eliminated, the value of $T_c^{-1}$ (for the sections $c_{11}$, $cd_{12}$, $cd_{13}$ and $d_{14}$) and the value of $T_r^{-1}$ (for the sections $r_{15}$, $s_{16}$, $s_{17}$ and $s_{18}$) may be chosen close to F; a favorable relationship is provided when $T_c^{-1}$ equals 1.4F and $T_r^{-1}$ equals .7F. With these values and a value of 6,000 for $\mu_0\beta_0$, a vector envelope has been compiled for the system of Figure 15 and appears as V''' in Figure 16. There have also been fractionally shown in Figure 16 the envelopes $V_1'''$ and $V_2'''$, representing changes of $\mu_0\beta_0$ to 19,000 and to 1,900, respectively. Curves of effect on gain at various frequencies have been compiled from the three respective envelopes and appear as W''', $W_1'''$ and $W_2'''$ in Figure 17. There will be apparent wide control over band width, as well as over regenerative peak amplitudes, by the $\mu_0\beta_0$ variation. And it will be understood that by the omission of one of each of the two groups of sections—for example of $d_{14}$ and $s_{18}$—the two fingers of the vector envelope now passing through the regeneration-representing regions near P may be spread apart and kept out of those regions, effectively eliminating the regenerative peaks independently of any adjustment of $\mu_0\beta_0$.

To illustrate again a combination of the inverse feed-back band-discriminating action with other such action, I have shown in tandem with M''' in Figure 15 band-elimination filter means 55 of the simplest variety—a series resistance 56 and shunt resonant circuit comprising inductance 57, capacity 58 and resistance 59. These may readily be arranged, as will be understood, to produce such a mild band-depressing effect on transmission-frequency characteristic of the system as is shown in Figure 18 by the curve Y'''. In this figure the curves Z''', $Z_1'''$ and $Z_2'''$ represent the superposition of the curve Y''' on the three respective curves of Figure 17; they show the very sharp and favorable band elimination, substantially devoid of regenerative peaks and of widely controllable width, produced by the combination under discussion.

It will be understood that the specific systems which I have already both shown and described illustrate the flexibility, rather than all the possibilities, of systems according to my invention; and that the various features shown in each are not limited to specific application, but are intended in general for interchangeable use as the requirements of any particular desired result may dictate. It will be further understood that my invention embraces the use of two or more feed-back circuits across the same or different amplifier portions, for the production of particular and special effects.

Thus in Figure 8, additionally to the apparatus already described, I have shown in tandem with $M_1'$ a second amplifier portion $M_2$ across which may be selectively connected, as by switch 61, a second feed-back circuit $B_2$. The parameters of $B_2$, in view of course of those of $M_2$, may be chosen to effect an action similar to that effected by $M_1'$—$B_1'$—resulting in an effective "squaring" of that action by the complete system. Again, by switch 61 there may be connected across $M_2$ a feed-back circuit $B_3$ arranged to produce, with $M_2$, cut-offs which are unregenerated but otherwise similar to regenerated cut-offs produced by $M_1'$—$B_1'$ (or vice versa)—resulting in an approximately right-angular cut-off qualitatively similar to, but quantitatively even sharper, than those designated in various figures by the letter Z (with various prime-marks and subscripts). Still again, by switch 61 there may be connected across $M_2$ a feed-back circuit $B_4$ arranged, in view of $M_2$, to provide a band elimination in a frequency region (e. g., a high one) separated from the band which $M_1'$—$B_1'$ eliminates by a pass-band—thus providing a band-pass filter action. And band-pass filter action may also or alternatively (switch 61 being open) be effected by the connection (as through contact of the fully movable switch pole 62 with contact 64 as well as with contact 63) of a feed-back circuit $B_2'$ simultaneously with $B_1'$ across the amplifier portion $M_1'$—the parameters of circuit $B_2'$ being of course appropriately differentiated from those of $B_1'$ so that they respectively effect, each with $M_1'$ distinct band eliminations separated by a pass-band. Switch pole 62 may thus obviously provide, among other things, a selective control whereby low-pass, high-pass or band-pass action may be produced at will. Especially in these aspects of Figure 8 the specifically illustrated details of $M_1'$ and $B_1'$ will of course be understood not to be of importance.

It will be understood that while I have disclosed several types of reactance-resistance sections (which by way of preferred illustration have been shown as aperiodic or non-resonant sections), these are obviously not the only ones which may be satisfactorily employed in embodiments of my invention; there may, for example, be employed single sections which, by virtue of a larger number of components or different arrangment, produce the composite effect of two or more of the simpler sections which I have shown. Still other modifications of and elaborations upon the apparatus and method which I have disclosed will readily occur to those skilled in the art. But all these will not necessarily constitute departures from the spirit or scope of my invention, which scope I undertake in the appended claims to define broadly, limited only by the state of the art.

I claim:

1. A system for the transmission of electric oscillations, amplifying means serially included in said system, and inverse feed-back means bridged across said amplifying means for producing therewith a cut-off in said transmission between a desired frequency band and an adjacent frequency band, said feed-back means including, in serial arrangement with its output, filter means having a propagation factor whose absolute magnitude is, over said desired band, at most of the order of the reciprocal of the absolute magnitude of propagation factor of said amplifying means and is, over said adjacent band, materially larger than said reciprocal.

2. A system for the transmission of electric oscillations, amplifying means serially included in said system, and inverse feed-back means bridged across said amplifying means for producing therewith a cut-off in said transmission between a desired frequency band and an adjacent frequency band, said feed-back means including a non-resonant filter and having a propagation factor whose absolute magnitude is, over said desired band, at most of the order of the reciprocal of the absolute magnitude of propagation factor of said amplifying means.

3. A system for the transmission of electric oscillations, amplifying means serially included in said system, and inverse feed-back means bridged across said amplifying means for producing therewith a cut-off in said transmission between a desired frequency band and an adjacent frequency band, said feed-back means including a non-resonant filter having reactance which is negative only, and said feed-back means having a propagation factor whose absolute magnitude is, over said desired band, at most of the order of the reciprocal of the absolute magnitude of propagation factor of said amplifying means.

4. A band-discriminating system for the transmission of electric oscillations within a desired frequency band and for the attenuation of oscillations in an adjacent band, comprising electrical amplifying means characterized by a vector propagation factor $\mu$, and a feed-back circuit including tandemed frequency-discriminating sections bridged across said amplifying means and characterized by a vector propagation factor $\beta$, in which the absolute magnitude of the quantity $(1-\mu\beta)$ remains essentially at a value of unity throughout said desired band and varies sharply around the frequency of division between said bands to have many times said value over said adjacent band.

5. A band-discriminating system for the transmission of electric oscillations within a desired frequency band and for the attenuation of oscillations in an adjacent band, comprising electrical amplifying means characterized by vector propagation factor $\mu$, and feed-back circuit including tandemed frequency discriminating sections bridged across said amplifying means and characterized by a vector propagation factor $\beta$, in which the product $\mu\beta$ has absolute magnitude of the order of unity at the frequency of division between said bands, has smaller absolute magnitudes in said desired band, and has larger absolute magnitudes in said adjacent band.

6. A band-discriminating system for the transmission of electric oscillations within a desired frequency band and for the attenuation of oscillations in an adjacent band, comprising electrical amplifying means characterized by vector propagation factor $\mu$, and a non-resonant frequency discriminating feed-back circuit bridged across said amplifying means and characterized by a vector propagation factor $\beta$, in which the product $\mu\beta$ has an absolute magnitude of the order of unity at the frequency of division between said bands, has smaller absolute magnitudes in said desired band, and has larger absolute magnitudes in said adjacent band.

7. A band-discriminating system for the transmission of electric oscillations within a desired frequency band and for the attenuation of oscillations in an adjacent band, comprising electrical amplifying means characterized by vector propagation factor $\mu$, and a feed-back circuit bridged across said amplifying means and characterized by a vector propagation factor $\beta$, in which the product $\mu\beta$ has an absolute magnitude of the order of unity and a phase angle small relative to 90° at the frequency of division between said bands, has smaller absolute magnitudes in said desired band, and has larger absolute magnitudes in said adjacent band.

8. A system for the transmission of electric oscillations within a desired frequency band, amplifying means serially included in said system, and reactance-resistance feed-back means comprising reactance of one sign only, connected with said amplifying means and substantially ineffective on the transmission-frequency characteristic thereof within said desired band, for producing a cut-off in said transmission adjacent the extremity of said band.

9. A system for the transmission of electric oscillations within a desired frequency band, amplifying means serially included in said system, and frequency-selective inverse feed-back means bridged across said amplifying means and substantially ineffective on the transmission-frequency characteristic thereof within said desired band, for producing a regenerated cut-off in said transmission adjacent the extremity of said band.

10. A system for the transmission of electric oscillations, amplifying means serially included in said system, and inverse feed-back means connected with said amplifying means for producing therewith a cut-off on each side of a frequency band through which the transmission-frequency characteristic of said system is substantially normally maintained.

11. A system for the transmission of electric oscillations within a desired frequency band, amplifying means serially included in said system and having at least two serially arranged portions, and respective inverse feed-back means bridged across said portions each for producing a respective cut-off in said transmission between said desired band and an adjacent band, said circuits being so mutually differentiated as to regenerate at least one but less than all of said cut-offs.

12. A system for the transmission of electric oscillations within a desired frequency band, amplifying means serially included in said system, inverse feed-back means bridged across said amplifying means for producing in said transmission a regenerated cut-off between said desired band and an adjacent band, and filter means included in said system in serial relationship to said amplifying means for producing in said transmission a similarly directed but unregenerated cut-off between said bands.

13. A system for the transmission of electric oscillations, amplifying means serially included in said system, means associated with said amplifying means for reducing amplitude contrasts in said oscillations, and inverse feed-back means bridged across said amplifying means for producing therewith a cut-off between different frequency bands in said transmission, said feed-back means being at least partially common with said contrast-reducing means.

14. A system for the transmission of electric oscillations, amplifying means serially included in said system; means, comprising a rectifier and a filter, and associated with said amplifying means, for reducing amplitude contrasts in said oscillations; and inverse feed-back means bridged across said amplifying means for producing therewith a cut-off between different frequency bands in said transmission, said feed-back means being at least partially common with said filter.

15. A system for the transmission of electric oscillations; amplifying means serially included in said system and including at least one repeater tube; bias filter means for said tube; and inverse feed-back means bridged across said amplifying means for producing therewith a cut-off between different frequency bands in said transmission, said bias filter being at least partially common with said feed-back means.

16. In the transmission of electric oscillations, the method of frequency band control which comprises amplifying said oscillations, aperiodically selecting a frequency-varying portion of said amplified oscillations, and re-amplifying said portion in common with said initial oscillations in highly attenuating phase and amplitude relationship thereto over at least one frequency band and in at most negligibly attenuating relationship thereto over at least one adjacent frequency band.

17. In the transmission of electric oscillations, the method of efficiently transmitting the oscillations within a desired frequency band while attenuating the oscillations within an adjacent band which comprises amplifying said oscillations, selecting a frequency-varying portion of said amplified oscillations, and re-amplifying said portion in common with said initial oscillations in at most negligibly attenuating phase and amplitude relationship thereto over said desired band, in highly attenuating relationship thereto over said adjacent band, and in re-enforcing relationship thereto around the frequency of division between said bands.

18. In the transmission of electric oscillations, the method of frequency band control which comprises amplifying said oscillations, selecting a frequency-varying portion of said amplified oscillations, and re-amplifying said portion in common with said initial oscillations in at most negligibly attenuating phase and amplitude thereto over one frequency band, and in highly attenuating relationship thereto over both a higher band and a lower band.

19. In the transmission of electric oscillations, the method of efficiently transmitting the oscillations within a desired frequency band while attentuating the oscillations within an adjacent band, which comprises amplifying said oscillations, non-resonantly selecting a frequency-varying portion of the amplified oscillations, and re-amplifying said portion in common with the initial said oscillations in at most neglibly attenuating phase and amplitude relationship thereto over said desired band and in highly attenuating phase and amplitude relationship thereto over said adjacent band.

GEORGE H. FRITZINGER.